Dec. 26, 1967  B. E. SHLESINGER, JR  3,360,657
LIGHT RESPONSIVE CROSS BAR SWITCH
Filed Nov. 25, 1964  3 Sheets-Sheet 1
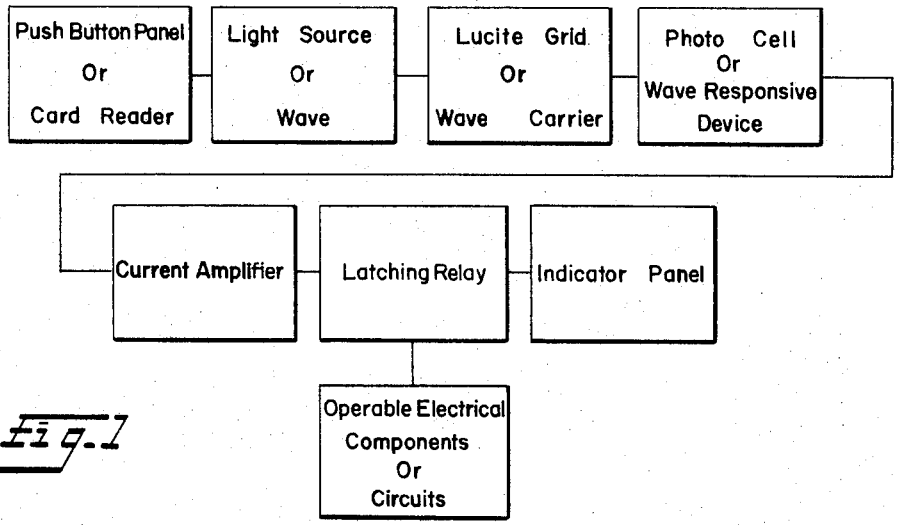
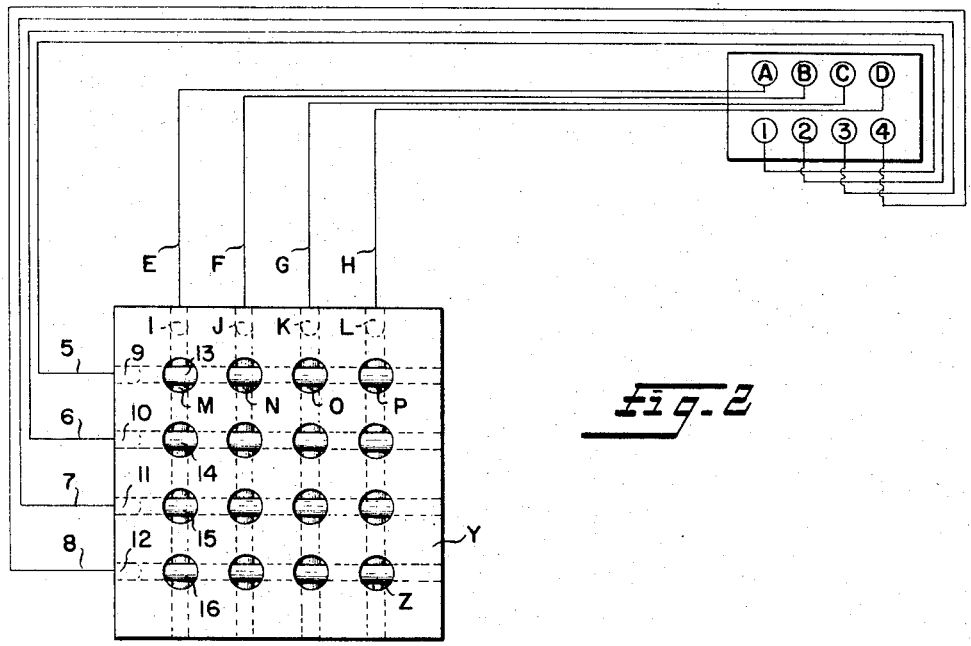
INVENTOR
*Bernard Edward Shlesinger, Jr.*

Dec. 26, 1967   B. E. SHLESINGER, JR   3,360,657
LIGHT RESPONSIVE CROSS BAR SWITCH
Filed Nov. 25, 1964   3 Sheets-Sheet 2
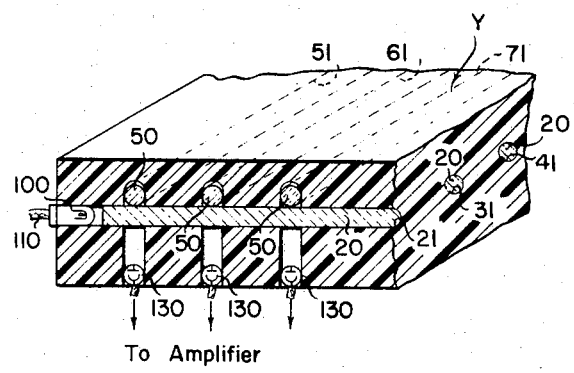
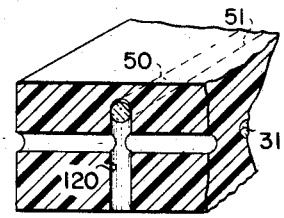
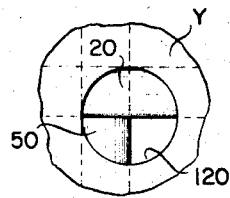
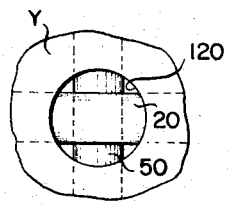
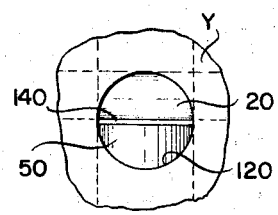
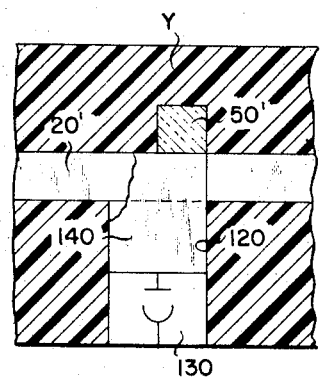
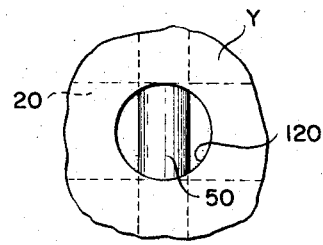
INVENTOR
Bernard Edward Shlesinger, Jr.

Dec. 26, 1967   B. E. SHLESINGER, JR   3,360,657
LIGHT RESPONSIVE CROSS BAR SWITCH
Filed Nov. 25, 1964   3 Sheets-Sheet 3
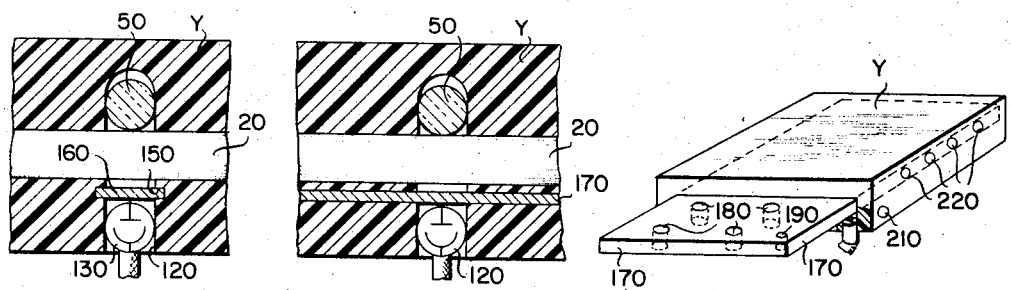
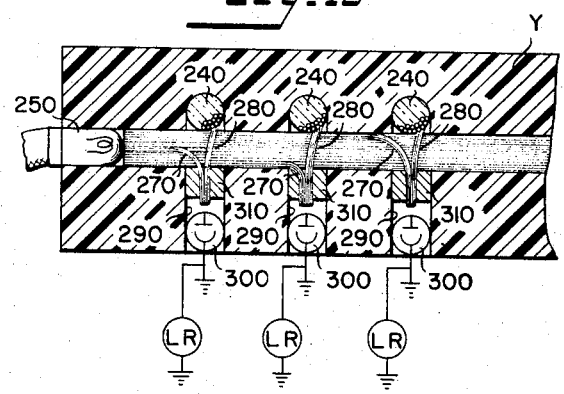
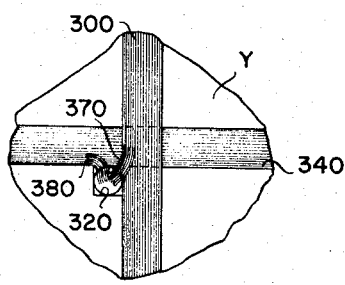
INVENTOR
Bernard Edward Shlesinger, Jr.

United States Patent Office 3,360,657
Patented Dec. 26, 1967

3,360,657
LIGHT RESPONSIVE CROSS BAR SWITCH
Bernard Edward Shlesinger, Jr., 906 Bruce Lane,
Annandale, Va. 22003
Filed Nov. 25, 1964, Ser. No. 413,903
23 Claims. (Cl. 250—227)

ABSTRACT OF THE DISCLOSURE

A cross bar switch comprising a panel board; a first series of light or wave transmitting or signal carrying members positioned in the panel board in parallel spaced relation to each other; a second series of light or wave transmitting or signal carrying members positioned in the panel board in parallel spaced relation to each other and in crossed relation to the first series of members to form a grid arrangement having spaced intersections; a separate light, wave, or signal transmitting source for each of said transmitting or signal carrying members; means for selectively operating each of said sources; the spaced intersections in the zone thereof each having located therein a light or wave or signal sensitive element sensitive to the combined light or wave or signal only in one of said first and one of said second transmitting or signal carrying members in the zone of their intersection; and means connecting each of said light, wave, or signal sensitive elements to an electrical component.

---

This invention relates to cross bar switching mechanisms and particularly those which are responsive to light or similar wave type energy.

In the past, cross bar switching has been done primarily by mechanical means which is relatively slow and requires rather complex equipment.

It is therefore an object of this invention to provide a cross bar switch mechanism which is extremely fast and reliable.

Another object of this invention is to provide a cross bar switching mechanism which requires few if any moving parts.

Yet a further object of this invention is to provide a cross bar switch which can be manufactured from inexpensive materials readily available on the market.

Another object of this invention is to provide a cross bar switching mechanism which has great flexibility for use in telemetering, telephony, telegraphy, and in general in any programming or communications system.

These and other objects of this invention will be apparent from the following description and claims:

Summary

This invention specifically utilizes the combined intensity of light or other wave medium where two sources of light intersect one another. At the point of intersection, there is an increased intensity which may be utilized to activate or affect some type of electrical system so as to open a circuit, close a circuit, operate a major component, or the like. Specifically, one mode of invention would be to have light picked up at the intersection of two lucite rods by a photocell or photomicroswitch for operating an electrical component or circuit.

In the drawings which illustrate the various embodiments of this invention:

FIGURE 1 is a block diagram illustrating the basic operation of a light sensitive cross bar switching system as taught by this invention.

FIGURE 2 is a plan view illustrating a push button panel and a lucite grid panel board as taught by the invention.

FIGURE 3 is a fragmentary elevational view partially in cross section showing the light source, the light transmitting, and the light sensitive members set into the block.

FIGURE 4 is a view similar to FIGURE 3 without the members set into the block.

FIGURES 5 through 8 are fragmentary plan views illustrating various ways of arranging the light transmitting members.

FIGURE 9 is an enlarged fragmentary cross sectional view illustrating another modification and arrangement of the light transmitting members and the light sensitive member.

FIGURES 10 and 11 are fragmentary cross sectional views illustrating two different ways of blocking light to the light sensitive member.

FIGURE 12 is a perspective view of the panel board and its light interrupting member partially inserted therein.

FIGURE 13 is a fragmentary cross sectional view illustrating a further embodiment of this invention.

FIGURE 14 is a fragmentary cross sectional view showing another embodiment of this invention.

FIGURE 15 is a fragmentary bottom plan view of the invention as taught in FIGURE 13.

FIGURE 1

For purposes of simplification and understanding, FIGURE 1 illustrates the manner in which an impulse initially starts a chain of events which winds up in the operation of an electrical component or circuit. Initially a push button may be used to close the switch or a card be inserted into a card reader to do likewise. Once the switch has been closed, a light or wave source will be transmitted through a Lucite grid or wave carrier to be picked up under certain conditions by a photocell or some similar wave responsive device such as a photomicroswitch etc. The small amount of current produced in the photocell is amplified if necessary to operate a latching relay or similar device. The latching relay or in the alternative, the photocell or wave responsive device, will be connected to the circuit to operate an indicator panel for purposes of advising the operator which circuits are open and which are closed. In addition, the locking relay when activated serves to operate an electrical component or circuit. It will be obvious that the electrical component or circuit may be connected directly to the photocell or wave responsive device thereby doing away with the current amplifier and the latching relay.

FIGURE 2

In FIGURE 2, a push button panel X is provided with a series of push buttons A, B, C and D and 1, 2, 3, and 4. The push buttons A, B, C, and D are connected by leads E, F, G and H to light sources I, J, K and L mounted in a panel board Y. The light sources I, J, K and L abut light transmitting members M, N, O and P.

Panel board X is provided with push buttons 1, 2, 3, and 4 connected by leads 5, 6, 7 and 8 to light sources 9, 10, 11 and 12 abutting light transmitting members 13, 14, 15 and 16 in the panel board Y.

Within the framework of the panel board Y, are a series of openings Z located at approximately the intersections of the light transmitting members M, N, O, P, and 13, 14, 15, and 16.

It will now be obvious that depression of buttons A and 1 will light up the light transmitting members 9 and I and that a light sensitive element (not shown) will be effected by the combined light energy of the transmitting members 9 and I at their point of intersection. It will be obvious that various types of wave energy could be utilized providing a proper carrier is used. Within the broadest scope of this invention, it is contemplated that any wave energy such as ultraviolet light, infrared light, radio waves, laser beams, and so on can be utilized as well as regular white light.

FIGURES 3 through 9

As best shown in FIGURE 3, the block Y which may be of transparent or opaque material such as plastic, wood, or the like, is provided with a first series of parallel openings 21, 31, and 41 and a second series of parallel openings 51, 61 and 71 which are likewise parallel to each other but which are transverse to the first series and as illustrated lie above but in close proximity to the first series. The openings or passageways 21, 31, 41, 51, 61 and 71 have inserted therein Lucite rods 20 and 50. Rods 20 cross under the rods 50 as illustrated in FIGURE 3. At the ends of the passageways as at passageway 21 etc. are located individual light sources 100 having leads 110. The light sources may be embedded in the block Y as illustrated or may bet set in some type of support adjacent the block in order to direct light through the Lucite rods 20 and 50.

The block Y has a series of vertically extening passageways 120 which extend from the bottom of the block and pass upwardly through the intersection of the various passageways 21, 31, 41, 51, 61, and 71 as illustrated. Mounted in the lower portion of the passages 120 are sensing devices such as photoelectric cells, photosensitive switches, and the like 130. The photocells would lead to individual circuit components for operation thereof.

FIGURE 5 illustrates how the vertical passageway 120 is offset from the center of the intersection of Lucite rods 20 and 50. This is done in order to permit light to be transmitted from both of the rods directly to the light sensitive device without one rod interfering with the other as would be the case if the bottom rod completely covered the opening 120, since the upper rod might prove ineffectual in transmitting light from it through the lower rod and thence to the photocell.

FIGURE 6 shows the rods 20 and 50 being of the same diameter with the opening 120 substantially of greater diameter and the rods having their central axes intersecting at the central axis of the opening 130. It is thus seen that light will be transmitted from both of the rods to a light transmitting pickup device.

FIGURE 7 shows a further variation in which the rod 20 has its axis offset from the central axis of the opening 120 in the block Y. In FIGURE 7, the rod 50 has a diameter substantially that of the opening 130 and substantially twice that of the rod 20. This arrangement provides an equal amount of luminosity from each of the two intersecting rods.

FIGURE 8 illustrates a slightly different embodiment in which the rod 20 is positioned behind the rod 50 through both having their central axis intersecting the axis of the hole 120. The rod 50 has a diameter smaller than the rod 20 though substantially that of the opening 120.

FIGURE 9 illustrates how the opening 120 is divided by a partition 140 to direct light from the rod 50' to the right half of the photocell 130 only. The light from the rod 20' will be directed into both of the photocells. It will be obvious that other arrangements might also prove effectual for proper balancing of the light from the intersection of the rods.

It will be obvious that the block Y may be of laminated construction or molded with the various passageways formed therein or drilled as the case may be. The material of the block Y may be transparent or opaque. In order to afford maximum sensitivity, it is desirable that the block V be opaque or that the passageways 120 be coated with an opaque material. Preferably the passageways and particularly the openings 120 would be coated with a reflecting material as for example by silvering and the like. The spacer 140 may also be silvered and would be in any event of opaque material.

FIGURES 10, 11 and 12

In FIGURE 10, the board Y is formed with a series of slots such as 150 which form a channel-way for receipt of a blocking strip 160. The blocking strip 160 extends across one row of openings 120. The strip 160 may be withdrawn at any time and if necessary, only pieces of blocking strip may be inserted for positioning over certain of the openings 120. It will be obvious that the advantages of the strip 160 are to eliminate certain operating circuits at all times when the cross bar switching system is programmed by means of a card reader or a direct insert member as will be described hereafter. The blocking member 160 blocks the light from rods 20 and 150 from being picked up by the photocell 130. Rather than have a series of strips for each row, FIGURES 11 and 12 show how an insertable card 170 best shown in FIGURE 12 may be positioned in the block Y. The card 170 will have certain areas perforated as at 180. The perforations will correspond with the intersections or zones to permit light to pass through to the photocells 130. The cards 170 will have an opening in a corner 190 which cooperates to receive a switch plunging mechanism 200. The switch mechanism 200 has circuit maker and breaker with a plunger thereon cooperating with the opening 190 in the card 170 so that no circuits in the board will be operated until the card 190 is thrust full into the block Y. The circuit maker and breaker 200 will control a central source of current to the whole system to prevent premature operation of the system during insertion and withdrawal.

The board Y as shown in FIGURE 12 will have a multiple connector opening 210 for leading off the leads from the various photocells. Other openings 220 are provided for insertion of the light sources 110 as provided in FIGURE 3.

FIGURES 13, 14 and 15

In the construction illustrated in FIGURES 13, 14 and 15, the passageways in the block Y instead of having Lucite rods, contain optical fiber bundles or rods 230 and 240. Fiber optics is becoming quite important in the field of light transmission and it will now be obvious that by placing a fiber optic rod in the various passageways, branches of the original trunk may be led off and directed against the photocell.

As illustrated in FIGURE 13, the light source 250 abuts the trunk 260 of the fiber optic rod 230. Similar light sources 250 would abut rods 240 at their trunk portion. Branches of fibers 270 and 280 extend from rods 230 and 240 respectively and end in openings 290 in the board Y. The ends of the branches 270 and 280 direct the light travelling therethrough against the photocells or the like 300. As illustrated, the ends of the branches 270 and 280 may be centered within the openings 290 by means of a grommet 310. The ends of the various tubes may be randomly associated to direct light directly at the photocell in one area or may be disassociated so as to direct light to different areas of the photocell 300.

The photocells 300 would be each connected to a latching relay LR as illustrated or to some other type of current responsive mechanism.

FIGURES 14 and 15 merely illustrate a panel board Y in which the opening 320 is offset from the passageways 330 and 340 which support the fiber optic rods 350 and 360 respectively. Branches 370 and 380 are directed into the opening 320 which provides a snug fit therefore for projecting light directly against the photocell 390.

The arrangement shown in FIGURES 14 and 15 is made in order to provide some ease in assembly since the block could be formed of laminated pieces permitting the rods 340 and 360 to be laid in the various passageways 330 and 340.

Operation

When it is desired to operate this system, an operator depresses a coordinate pair of buttons such as A and 1 which will operate to light rods 13 and M as in FIGURE 2. At the intersection of these two rods, the light intensity will be doubled and picked up by the proper photocell positioned in the zone of intersection as illustrated in the other figures. The photocell will be responsive only to the double light intensity and will not respond when only a single rod is lit in any intersection. The signal received on the photocell will be transmitted to a circuit such as an amplifying circuit which in turn will operate a latching relay to close a circuit to operate an electrical component. The latching relay will maintain the circuit closed even though buttons A and 1 are released until such time as these two buttons are again depressed. Upon depression of the same coordinating buttons, the photocell will again be sensitive to the combined light energy and operate to reopen the system or circuit. In this manner, a whole series of circuits may be tied to the intersections and each one operated selectively from the other and maintained in operation after the first signal has been transmitted to the photocell and made inoperable after a second signal is transmitted. It is therefore obvious that the buttons in panel X need only be depressed for a short period of time in order to make this system operable for programming.

It will now be obvious that if the panel X has all of the buttons depressed or in the case where the panel is slotted to receive a card for selective depression of certain buttons or their equivalents, that the whole panel board may be lit up simultaneously to operate all components of the system. If all of the panel board is lit up and all systems are operating, certain of the systems may be blocked out by insertion of a strip 160 or card 170 as illustrated in FIGURES 10 through 12.

From the above it will now be seen that considerable flexibility of operation can be obtained either by utilizing the push button arrangement of the panel X or by utilizing a card reader system to substitute for panel X and by coordinating this system with a card insert system as illustrated in FIGURES 10 through 12 wherein the strip 160 or card 170 may be inserted having certain block areas as desired.

While the invention has been described, it will be understood that it is capable of further modifications and this application is intended to cover any variations, uses, or adaptations of the invention following in general, the principles of the invention and including such departures from the present disclosure as come within known or customary practice in the art to which the invention pertains, and as may be applied to the essential features hereinbefore set forth and as fall within the scope of the invention or the limits of the appended claims.

Having thus described my invention what I claim is:
1. A cross bar switch comprising:
 (a) a panel board;
 (b) a first series of light transmitting members positioned in said panel board in parallel spaced relation to each other;
 (c) a second series of light transmitting members positioned in said panel board in parallel spaced relation to each other and in crossed relation to said first series of members to form a grid arrangement having spaced intersections;
 (d) a separate light source for each of said light transmitting members;
 (e) means for selectively operating each of said light sources;
 (f) said spaced intersections in the zone thereof each having located therein a light sensitive element sensitive to the combined light only in one of said first and one of said second light transmitting members in the zone of their intersection; and
 (g) means connecting each of said light sensitive elements to an electrical component.
2. A cross bar switch as in claim 1 and wherein:
 (a) said light transmitting members comprise Lucite rods.
3. A cross bar switch as in claim 2 and wherein:
 (a) said Lucite rods are opaquely coated except in the zone of intersection.
4. A cross bar switch as in claim 2 and wherein:
 (a) said Lucite rods are potted in said panel board;
 (b) said panel board having passageways therein at the zone of intersection;
 (c) one of said first and one of said second light transmitting rods extending into, through and out of each of said passageways, and;
 (d) a light sensitive element in each of said passageways.
5. A cross bar switch as in claim 4 and wherein:
 (a) said passageway is coated with an opaque coating.
6. A cross bar switch as in claim 4 and wherein:
 (a) said rods in each of said passageways have their center axis offset from the center axis of said passageway.
7. A cross bar switch as in claim 4 and wherein:
 (a) said rods in each of said passageways have their center axis passing through the center axis of said passageway, and;
 (b) the width of said rods being substantially less than the width of said passageway.
8. A cross bar switch as in claim 4 and wherein:
 (a) one of said rods in each of said passageways has its center axis passing through the center axis of said passageway and;
 (b) the second of said rods in said passageway having its center axis offset from the center axis of said passageway.
9. A cross bar switch as in claim 8 and wherein:
 (a) said second of said rods is half the width of said one of said rods.
10. A cross bar switch as in claim 1 and wherein:
 (a) said light transmitting members each comprise a fiber optical rod.
11. A cross bar switch as in claim 10 and wherein:
 (a) each of said rods comprises a major trunk line having branch lines extending therefrom;
 (b) said light sources for said rods being adjacent the beginning of said major trunk lines.
12. A cross bar switch as in claim 11 and wherein:
 (a) each zone of intersection includes a first branch line from said first series of light transmitting rods and a second branch line from said second series of light transmitting rods forming a pair of light shafts in close proximity to their respective light sensitive element;
 (b) said pairs of light shafts each having their ends directing light at said respective light sensitive element.
13. A cross bar switch as in claim 12 and wherein:
 (a) said panel includes a series of spaced passageways, and;
 (b) one of said pairs of light shafts and a light sensitive element being mounted in each passageway.
14. A cross bar switch as in claim 1 and wherein:
 (a) said light sources are mounted in said panels and abutting the end of their respective light transmitting member.
15. A cross bar switch as in claim 1 and including:
 (a) a panel control board for selectively operating said light sources.
16. A cross bar switch as in claim 15 and including:
 (a) a latching relay connected to each of said light sensitive elements whereby an electrical component is operated upon a first light impulse received on said light sensitive element to set said relay and maintained operative until a second light impulse is received on said light sensitive element to release said relay.
17. A cross bar switch as in claim 1 and including:
 (a) means insertable in said panel between said light sensitive means and said light transmitting members for blocking certain of said intersections to prevent light transmission to said light sensitive element.

18. A cross bar switch as in claim 17 and wherein:
(a) said insertable means includes a punched card.

19. A cross bar switch as in claim 18 and wherein:
(a) said panel includes a circuit breaker operable to close a circuit upon full insertion of said card into said panel, and open said circuit upon withdrawal of said card from said panel.

20. A cross bar switch comprising:
(a) a panel board;
(b) a first series of wave form transmitting members positioned in said panel board for transmitting a first series of waves in parallel spaced relation across said board;
(c) a second series of wave form transmitting members positioned in said panel board for transmitting a second series of waves in parallel spaced relation across said board and in crossed relation to said first series of waves to form a wave form grid arrangement having spaced intensity areas where said first and second waves intersect;
(d) means for selectively operating each of said transmitting members, and;
(e) said spaced intensity areas each having located therein, a wave sensitive element, sensitive to the combined intensity of only of one of said first series of waves and one of said second series of waves at the intersection;
(f) and means connecting each of said wave sensitive elements to an electrical component.

21. A cross bar switch comprising:
(a) a panel board;
(b) a first series of signal carrying members positioned in said panel board in parallel spaced relation to each other;
(c) a second series of signal carrying members positioned in said panel board in parallel spaced relation to each other and in crossed relation to said first series of members to form a grid arrangement having spaced intersections;
(d) a signal transmitting source for each of said signal carrying members;
(e) means for selectively operating each of said signal sources;
(f) said spaced intersections in the zone thereof each having a signal sensitive element sensitive to the combined signals only in one of said first and one of said second signal carrying members at their zone of intersection, and;
(g) means connecting each of said signal sensing elements to an electrical component.

22. A cross bar switch comprising:
(a) a panel board;
(b) a series of intersecting light transmitting members positioned in said panel board;
(c) a separate light source for each of said members;
(d) means for selectively operating each of said light sources;
(e) a series of light sensitive elements located at the intersection of said light transmitting members, each sensitive to the combined light of two intersecting light transmitting members in the zone of their intersection only;
(f) and means connecting each of said light sensitive elements to an electrical component for operation thereof when said light sensitive element is responsive to said combined light.

23. A cross bar switch as in claim 22 and wherein:
(a) said intersecting light transmitting members are on X and Y axes; and,
(b) said light sensitive element is on a Z axis.

References Cited

UNITED STATES PATENTS

| | | | |
|---|---|---|---|
| 2,506,672 | 5/1950 | Kell et al. | 250—227 X |
| 2,881,976 | 4/1959 | Greanias | 250—227 X |
| 3,109,065 | 10/1963 | McNaney | 250—227 X |
| 3,150,356 | 9/1964 | Newman | 250—227 X |
| 3,169,190 | 2/1965 | Ress | 250—227 X |

RALPH G. NILSON, *Primary Examiner.*

M. A. LEAVITT, *Assistant Examiner.*